United States Patent [19]

Bishop

[11] Patent Number: 5,810,599
[45] Date of Patent: Sep. 22, 1998

[54] INTERACTIVE AUDIO-VISUAL FOREIGN LANGUAGE SKILLS MAINTENANCE SYSTEM AND METHOD

[75] Inventor: Stanley Alden Bishop, Reston, Va.

[73] Assignee: E-Systems, Inc., Dallas, Tex.

[21] Appl. No.: 186,606

[22] Filed: Jan. 26, 1994

[51] Int. Cl.$^6$ ............................ G09B 19/06; G09B 19/08
[52] U.S. Cl. ..................... 434/157; 434/118; 434/156; 434/307 R; 434/362; 345/302
[58] Field of Search ..................... 434/118, 156, 434/157, 169, 185, 307 R, 308, 322, 323, 327, 335, 347, 350, 362; 364/419.01, 419.03, 419.08; 395/152, 154, 159, 160, 927; 381/51; 345/302, 327, 473; 348/473, 571, 705, 725; 707/500, 9; 704/1; 463/35, 1

[56] References Cited

U.S. PATENT DOCUMENTS

| | | | |
|---|---|---|---|
| 4,406,626 | 9/1983 | Anderson et al. | 434/157 X |
| 4,609,358 | 9/1986 | Sangster . | |
| 4,671,772 | 6/1987 | Slade et al. | 434/350 X |
| 4,712,180 | 12/1987 | Fujiyama et al. | 434/323 |
| 4,736,296 | 4/1988 | Katayama et al. | 434/157 X |
| 4,774,666 | 9/1988 | Miyao et al. | 434/157 X |
| 4,789,543 | 12/1988 | Spiece . | |
| 4,804,328 | 2/1989 | Barrabee . | |
| 4,884,972 | 12/1989 | Gasper . | |
| 4,931,950 | 6/1990 | Isle et al. | 395/11 |
| 4,954,969 | 9/1990 | Tsumura | 345/327 |
| 4,968,254 | 11/1990 | Gangwere, Jr. et al. | 434/118 |
| 5,010,495 | 4/1991 | Willetts . | |
| 5,065,317 | 11/1991 | Hiramatsu et al. | 434/157 X |
| 5,109,482 | 4/1992 | Bohrman . | |
| 5,111,409 | 5/1992 | Gasper et al. . | |
| 5,228,859 | 7/1993 | Rowe | 434/118 |
| 5,299,006 | 3/1994 | Kim | 348/571 |
| 5,302,132 | 4/1994 | Corder | 434/156 |
| 5,393,071 | 2/1995 | Best | 463/35 |

FOREIGN PATENT DOCUMENTS

| | | | |
|---|---|---|---|
| 0182460 | 5/1986 | European Pat. Off. | 434/157 |
| 4238848 | 5/1993 | Germany | 434/169 |
| 4348382 | 12/1992 | Japan | 434/156 |

OTHER PUBLICATIONS

"Physical Conditioning Equipment", Universal 1981–1982 Catalog, pp. 32 and 33.
"Cinema Project," University of Pennsylvania, pp. 1–14, Mar. 4, 1991.
"What Makes IVD Attractive for CALL," Paper Presented at CALICO '93 Assessment Symposium, pp. 1–22, 1993.
"Interactive Language Learning" by Eugene F. Gray, *French Review*, pp. 499–507.
"Survey of Interactive Language Discs," by Rubin et al, CALICO Journal, pp. 31–56, Mar. 1990.

*Primary Examiner*—Joe Cheng
*Attorney, Agent, or Firm*—Baker & Botts, L.L.P.

[57] ABSTRACT

A computer, responsive to user input, controls the presentation of an audio-visual work to a user. Through the selection of several interactive learning options, support and reinforcement of the learning process is provided. In particular, the computer interacts with the user to challenge the user's understanding of the audio-visual work. In connection with the presentation of foreign language works, the user interacts with the computer in role playing, transcription, translation, fill-in-the-blanks and speech repetition activities designed to teach the user to speak the foreign language. Furthermore, as the audio-visual work is presented, a computer generated transcription or translation is displayed for user contemplation, and the user may interact with the computer by requesting the display of grammatical, cultural and geographic notes the further assist in the learning process.

28 Claims, 6 Drawing Sheets

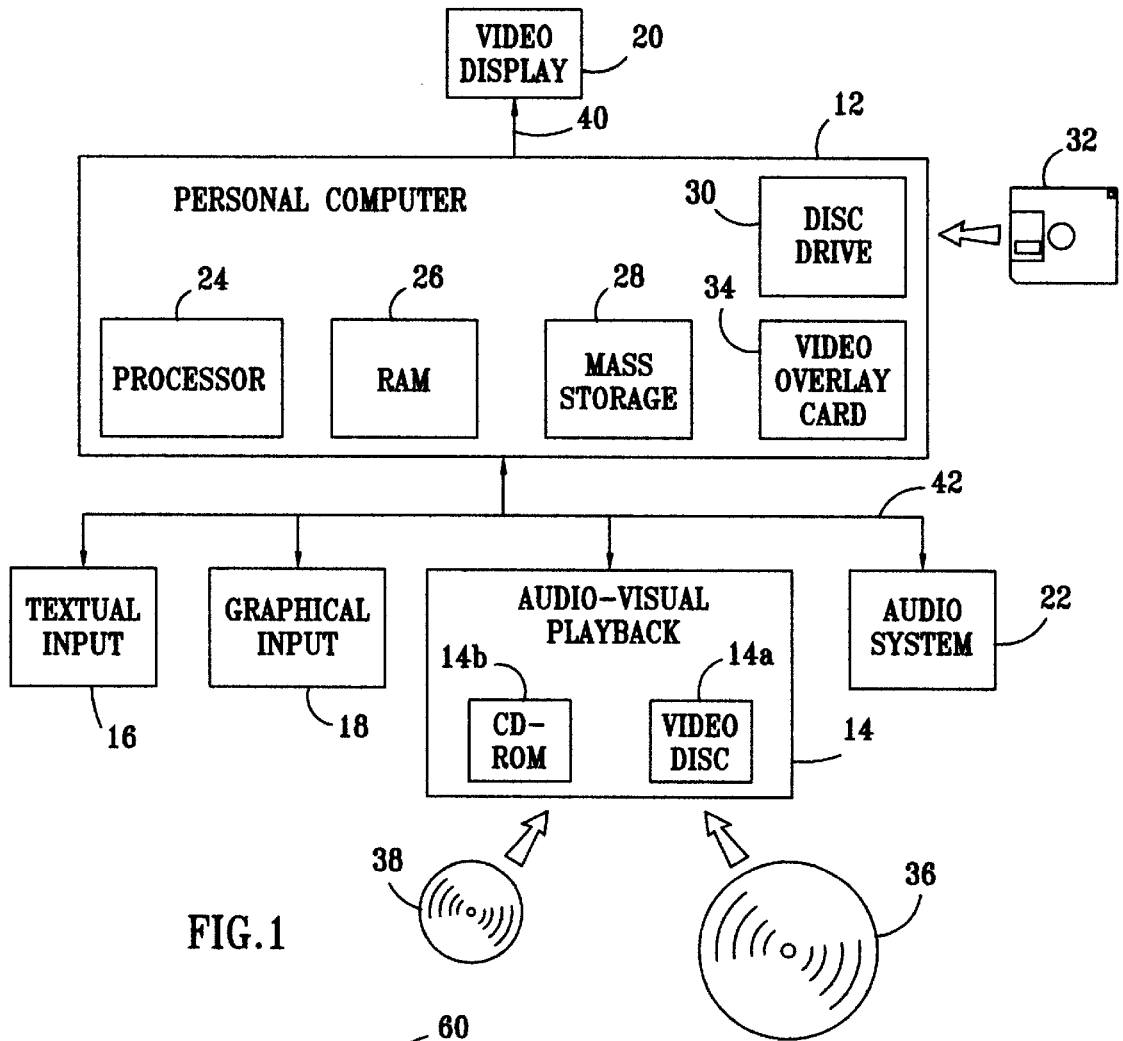
FIG.1
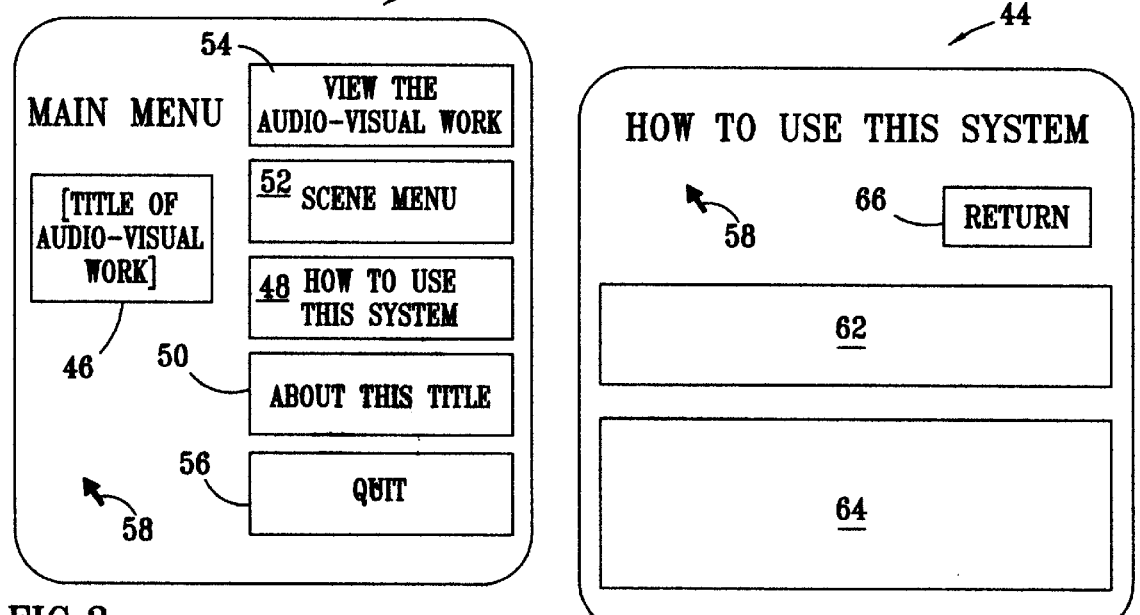
FIG.3
FIG.4

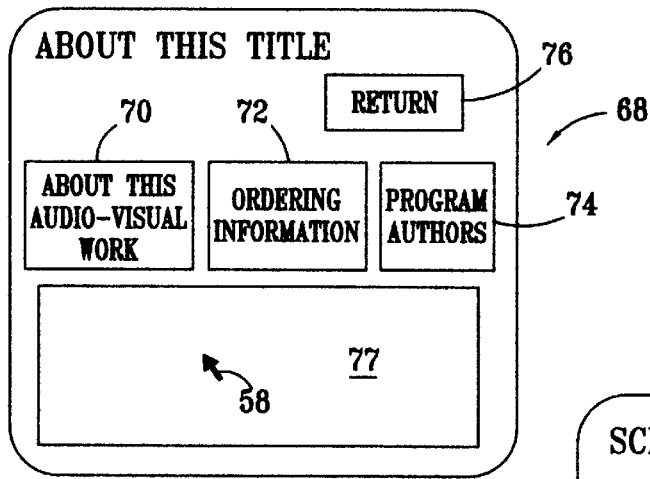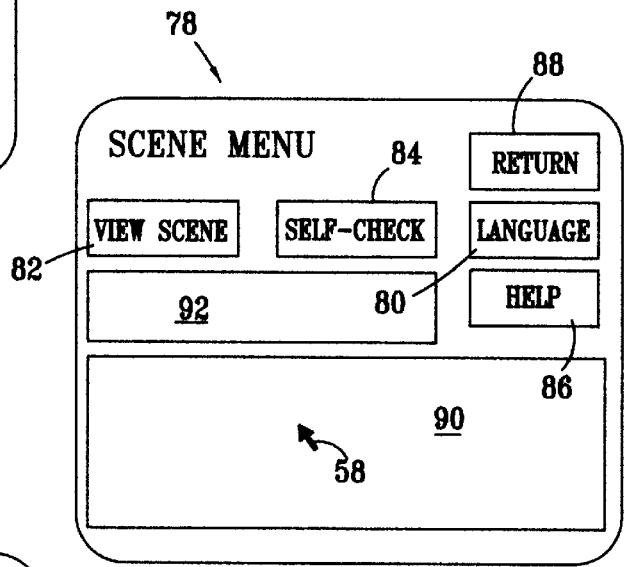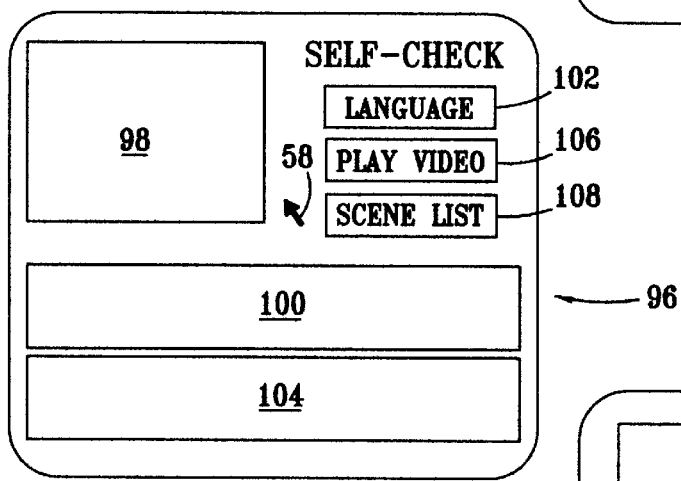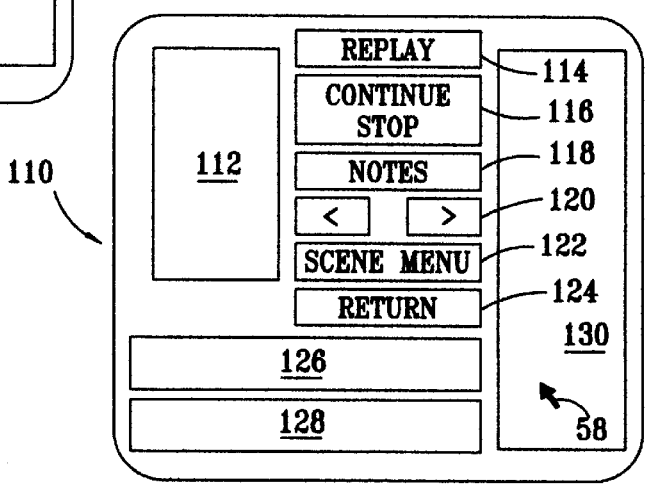

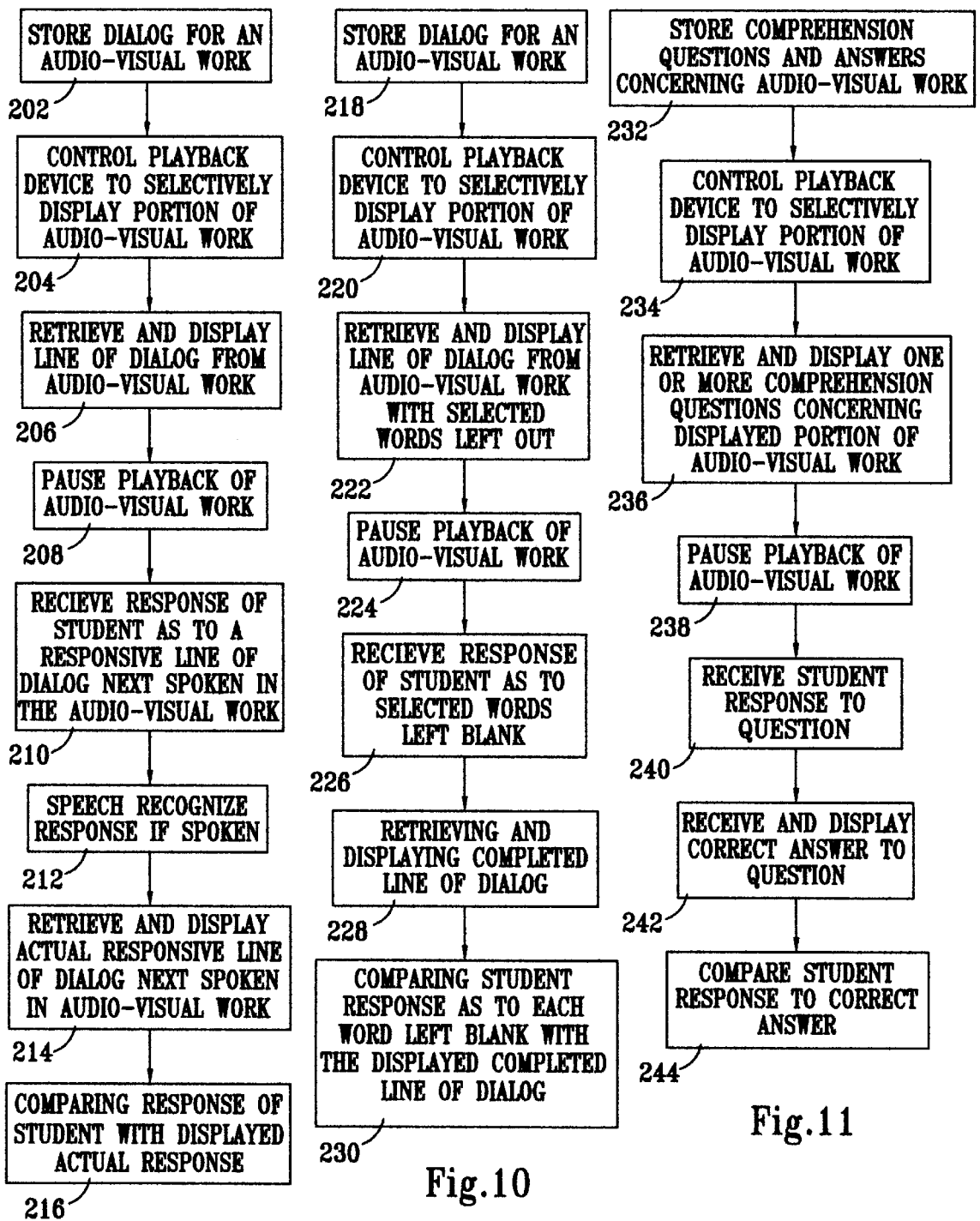

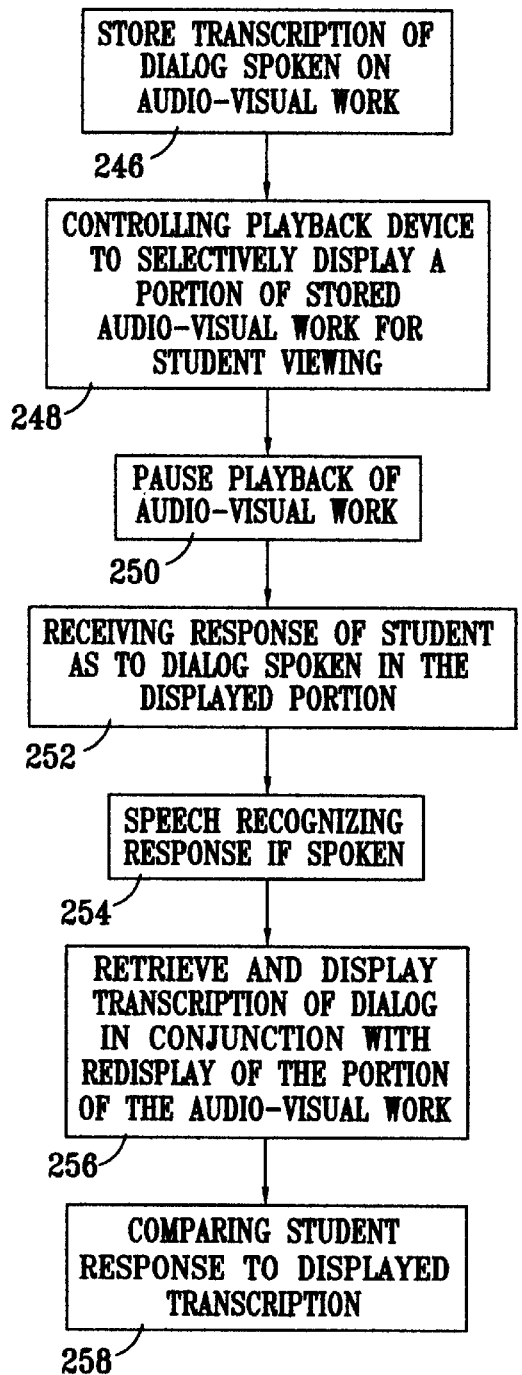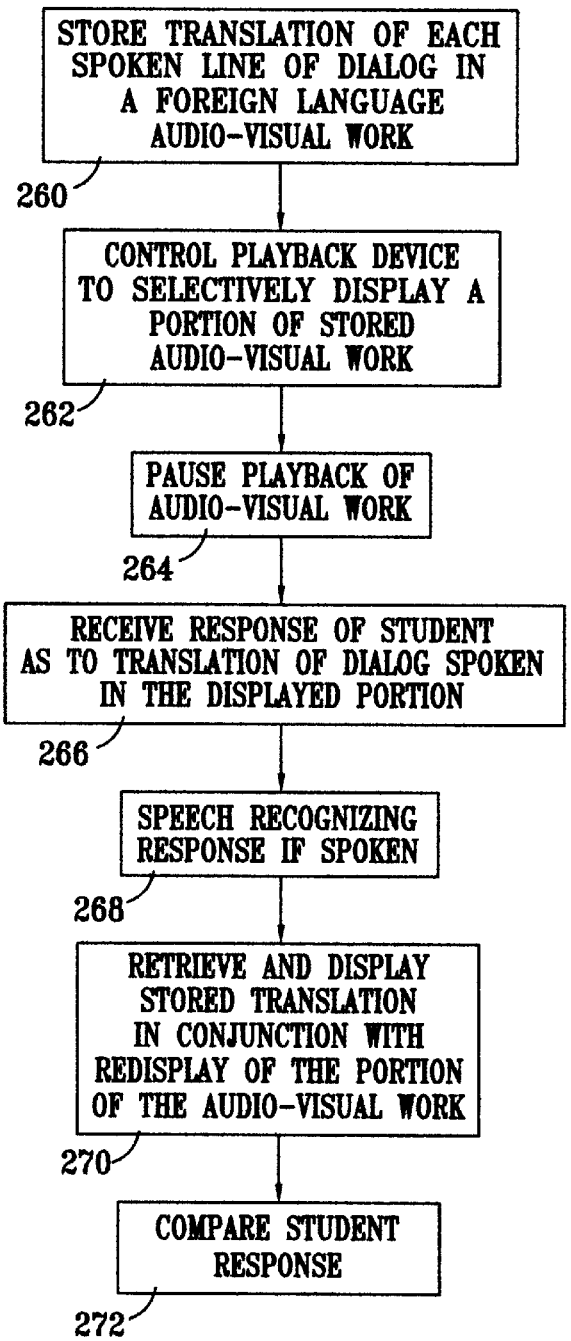
Fig.12
Fig.13

1

INTERACTIVE AUDIO-VISUAL FOREIGN LANGUAGE SKILLS MAINTENANCE SYSTEM AND METHOD

TECHNICAL FIELD

The present invention relates to teaching methods, teaching aids and teaching devices and, in particular, to an interactive audio-visual system for teaching students a foreign language skill.

BACKGROUND OF THE INVENTION

Foreign languages are most often taught to students in classroom situations wherein interaction with the teacher, and sometimes other students, in conjunction with the use of study materials such as text books and audio tapes, is the preferred method of instruction. Such classroom instruction adequately prepares students to handle routine communications tasks in the foreign country, such as ordering meals or asking for directions, but less than adequately prepares the student to engage in and understand foreign language conversations.

One reason that the traditional instruction methods are deficient is that the classes are generally directed to the instruction of the language in a formal or classic manner. Thus, the student receives little or no training regarding the colloquialism, slang, grammar and syntax of the language as it is commonly used in conversations in the foreign country. Another reason that the traditional methods are deficient is that the student is often instructed by a teacher whose native language is not the foreign language being learned by the student. Thus, the student fails to master the proper accent or pronunciation required to comfortably communicate in the foreign country.

Another significant concern of foreign language students is that their conversation skills decay from non-use. Polishing of their previously learned skills often requires enrollment in a formal refresher course, or a trip to the foreign country coupled with an extended stay. This can be quite an expensive proposition, especially in view of the fact that courses or trips as often as once a year may be required.

Accordingly, there is a need for a teaching method and system that prepares the foreign language student to speak in a conversational manner. Such a method or system should further facilitate the polishing of already acquired foreign language skills for those who do not have the opportunity to converse in the foreign language on a routine basis.

SUMMARY OF THE INVENTION

The present invention comprises an interactive audio-visual system preferably utilized for teaching students certain skills, such as a foreign language. The system of the present invention includes a computer interconnected with an audio-visual playback device. Operation of the audio-visual playback device is controlled by a resident system operation program executed by the computer in response to student inputs. The system functions with the computer both controlling the playback of an audio-visual work by means of the audio-visual playback device and interacting with the student concerning the displayed audio-visual work. Such interactions facilitate the process of learning the designated skill.

The student may selectively choose to view the entire work from beginning to end, or alternatively view individually selected scenes. During viewing, the computer interacts with the user to challenge the user's understanding of both the audio-visual work and the skill being taught. The nature of the interaction between the user and the computer varies according to the skill being learned. Upon request, the system will display a synopsis of the entire work or a selected scene, overlay the text of the script (including a translation) on the displayed video images, provide definitions of user selected words and phrases and display notes on grammar. Furthermore, the system tests student comprehension of the audio-visual work and the displayed skill by asking the student questions.

The present invention preferably uses foreign language audio-visual works in the instruction and practice of a foreign language. Such works provide a culturally authentic source of foreign language material for teaching students the colloquialisms, slang, grammar, syntax and accent that are needed to prepare the student to conversationally interact in the foreign country or polish already acquired language skills. In connection with the presentation of such foreign language works, the user interacts with the computer in role playing, transcription, translation, fill-in-the-blanks, language comprehension and speech repetition activities for the purpose of enhancing pronunciation and oral and reading comprehension skills. Furthermore, as the audio-visual work is presented, a computer generated transcription or translation is displayed for user contemplation, and the user may interact with the computer by requesting the display of grammatical, cultural and geographic notes that further assist in the learning process.

BRIEF DESCRIPTION OF THE DRAWINGS

A more complete understanding of the system of the present invention may be had by reference to the following Detailed Description when taken in conjunction with the accompanying Drawings wherein:

FIG. 1 is a block diagram of the interactive learning system of the present invention;

FIGS. 3 through 6 show representations of several menu screens displayed for the user to facilitate interactive user learning;

FIGS. 7 and 8 show representations of other screens displayed for the user to facilitate interactive user learning;

FIG. 9 is a flow diagram of a first interactive learning process performed by the interactive learning system of FIG. 1;

FIG. 10 is a flow diagram of a second interactive learning process performed by the interactive learning system;

FIG. 11 is a flow diagram of a third interactive learning process performed by the interactive learning system;

FIG. 12 is a flow diagram of a fourth interactive learning process performed by the interactive learning system;

FIG. 13 is a flow diagram of a fifth interactive learning process performed by the interactive learning system;

DETAILED DESCRIPTION OF THE DRAWINGS

Figure 2:
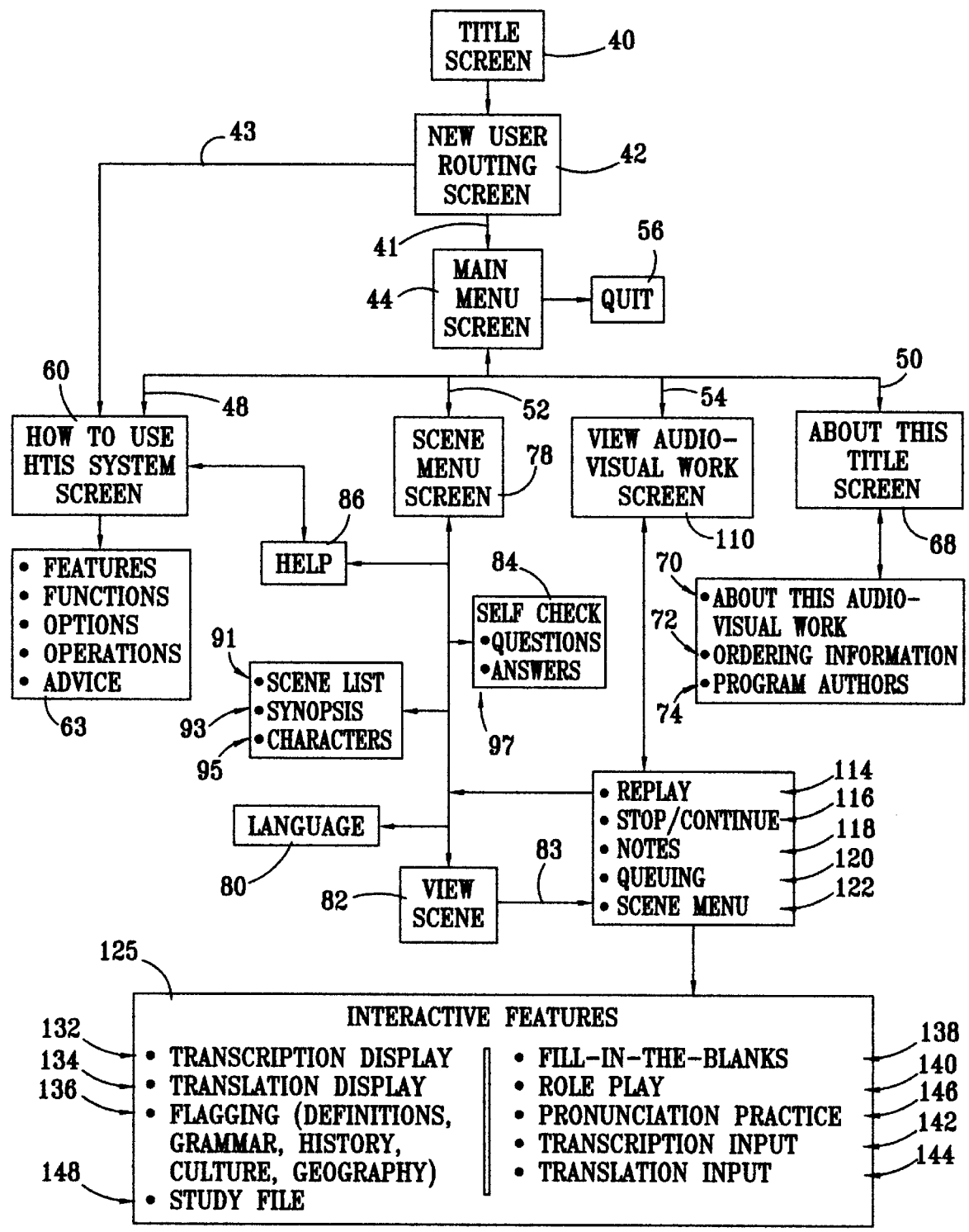
FIG. 2 is a flow diagram for the functional operations and screen displays of the interactive learning system of the present invention when used as an interactive audio-visual foreign language skills maintenance tool.

Reference is now made to FIG. 1 wherein there is shown a block diagram of the interactive learning system 10 of the present invention. The system 10 includes a personal computer 12, an audio-visual playback device 14, a textual input device 16, a graphical input device 18, a video display 20 and an audio system 22. The means for interconnecting the computer 12 to the various components shown in FIG. 1 is well known in the art. In the present embodiment, the video display 20 is connected to the personal computer 12 via a video cable 40. Furthermore, the personal computer 12 is connected to the audio-visual playback device 14, textual input device 16, graphical input device 18 and audio system 22 via a bus 42 which comprises both analog (including video cable) and digital communications lines.

The personal computer 12 preferably comprises an IBM AT-type (or equivalent) personal computer having a 386 (or better) processor 24, 2 MB random access memory (RAM) 26, 20 MB mass storage (hard drive) 28, a disc drive 30 and a motion video overlay card 34. It will, of course, be understood that any computing system having equivalent functional and operational capabilities may be substituted for the personal computer 12. The disc drive 30 allows the computer 12 to receive and access floppy data discs 32 containing program data and user data. Such data is accessed directly from the floppy disc 32 and/or stored by the computer in, and accessed from the RAM 26 and/or mass storage (hard drive) 28 as necessary. The motion video overlay card 34 allows the computer 12 to control not only the display of video images output from the audio-visual playback device 14 for display on the video display 20, but also to control the positioning and sizing of the images along with the overlay of computer generated text and images if desired.

The audio-visual playback device 14 preferably comprises a computer controllable video disc player 14*a* for receiving a video disc 36 and retrieving therefrom stored audio-visual data. The audio-visual data stored on the video disc 36 preferably comprises an audio-visual work such as a motion picture, a television show or other broadcast. In the alternative, or in addition, the audio-visual playback device 14 may comprise a controllable CD-ROM player 14*b* for receiving and retrieving audio-visual data from a compact disc 38.

The video display 20 preferably comprises a SVGA monitor for providing the display of high quality video images. The audio system 22 comprises self-amplifying speakers or headphones with volume control to facilitate user reception of the audio portions of audio-visual works output from the audio-visual playback device 14 and displayed on the video display 20. The audio system 22 further includes an audio input device, such as a microphone, to allow the user to input speech or other sounds into the computer 12 for subsequent processing or replay.

The textual input device 16 comprises a standard QWERTY-type alphanumeric keyboard, with function keys, through which the system user may both input alphanumeric text for processing and/or display by the computer 12 and select certain functions and operations for computer execution. The graphical input device 18 comprises either a joystick, mouse or trackball, as desired, to provide the computer user with a pointing and selecting device for on-screen selection of options and features in a well known manner (commonly referred to in the art as a "point-and-click" operation). It will, of course, be understood that other types of input devices may be used. For example, the video display 20 may further include a touch screen capability. In addition, the audio system 22 may be used for audible input with the addition of currently available or subsequently developed speech recognition functionality to the processor 24.

The processor 24 controls operation of the system 10, including controlling all communications by and between the personal computer 12 and the audio-visual playback device 14, textual input device 16, graphical input device 18, video display 20 and audio system 22. The personal computer 12 operates according to a system operation program downloaded from either the floppy disc 32 or the mass storage (hard drive) 28 to the RAM 26 for computer execution. The user of the system 10 commands the functioning and execution of the system operation program, and thus the operation of the system 10, by providing commands input via the textual and graphical inputs 16 and 18, respectively.

The operation of the system 10 of the present invention will be described in connection with its preferred embodiment as an interactive audio-visual foreign language skills maintenance tool. It will, of course, be understood that some, if not all, of the disclosed functionality provided by the system 10 of the present invention may be equally applicable to and appropriate for other educational and skill training exercises. For example, the system 10 of the present invention may be used to teach not only verbal and reading comprehension skills with respect to a foreign language, but also other language skills and/or physical and technical skills, if desired.

Regardless of the skill being taught, the user must first insert the appropriate video disc 36 for that skill into the video disc player 14*a* (or compact disc 38 into the CD-ROM player 14*b*). The video disc 36 (or compact disc 38) provides a storage media for the audio-visual and digital data used as source material to teach the selected skill to the user. Other data to be described associated with the subject matter recorded on the selected video disc 36, and necessary for instructing on the selected skill, is stored on a floppy disc 32. The digital data on the floppy disc 32 is accessed by the computer 12 using disc drive 30 in accordance with the executed system operation program in a manner to be described.

In the preferred use of the system 10 as an interactive foreign language teaching tool, the video disc 36 provides a storage medium for a recorded feature length foreign language film. Other audio-visual works providing authentic foreign language source material (such as television shows, speeches, musical and theatrical performances or sporting events) may also be recorded on video disc 36 for use in the system 10 of the present invention. The floppy disc 32 stores the digital data associated with the audio-visual data (for example, dialog transcription and translations, comprehension questions, etc.). This digital data is specially prepared to accompany the selected audio-visual work recorded on the video disc 36. The data on the floppy disc 32 thus provides additional information concerning the selected skill necessary for providing a more effective learning experience.

A more complete understanding of the operation of the system 10 of the present invention may be had by reference to FIG. 2, along with reference to FIG. 1 when appropriate, wherein FIG. 2 illustrates a flow diagram for the functional operations performed by system operation program and the screens displayed when the system 10 is used as an interactive audio-visual foreign language skills maintenance tool. It will, of course, be understood that some, if not all, of the steps and screen displays of the flow diagram of FIG. 2 may be equally applicable to the instruction of other skills using the system 10. Furthermore, any of the steps or screens may be altered or combined to display text, graphics or video data in alternate formats or to accommodate different subject matter and learning styles.

Following the loading of the video disc 36 for a selected audio-visual work and the loading of the associated floppy disc 32 providing additional teaching material for the selected work, the system operation program is executed and the computer 12 retrieves title data concerning the selected work from floppy disc 32 using disc drive 30. Such title data typically comprises the title of the audio-visual work, an identification of the makers (for example, producer and/or director) of the audio-visual work, copyright information for the audio-visual work, makers of and copyright information for the system operation program (along with copyright information for the data on the floppy disc 32), and copyright information for any other reference materials (such as a dictionary or map) accessed by the computer 12 during execution of the system operation program. The retrieved title data is displayed for the user on video display 20 using a title screen 40.

Following display of the title screen 40, and further in accordance with the system operation program executed by the computer 12, a new user routing screen 42 is displayed on video display 20. The new user routing screen 42 asks the user to input whether the user has previously operated the system 10 and is familiar with the functions and features of the system. If the user replies negatively (see path 43), the system operation program skips directly to a help function (to be described in more detail below) that provides the user with the requisite information for efficiently and effectively using the system 10. If the user has used the system 10 before, and so answers (see path 41) in response to the display of the new user routing screen 42, the computer 12 will proceed with the next step in the execution of the system operation program.

At this point, execution of the system operation program causes the main menu 44 (also shown in FIG. 3) to be displayed for the user via video display 20. With display of the main menu 44, the title of the audio-visual work selected by the user is retrieved from floppy disc 32 and displayed at 46. The user is further given the choice of selecting from five options: "How to Use this System" 48; "About this Title (or Program)" 50; "Scene Menu" 52; "View the Audio-Visual Work" 54; and "Quit" 56. Selection of one of the five options is made using the graphical input 18 to position cursor 58 over the option and depress a select key in accordance with the well known computer point-and-click operation. In the alternative, with speech recognition functionalities added to the processor 24, the user may audibly input the selection via the audio system 22.

In response to either the entry of a negative response following display of the new user routing screen 42 (see path 43) or the selection of the "How to Use this System" option 48 from the main menu 44 with either the cursor 58 and graphical input 18 (point-and-click) or audio system 22 input, further execution of the system operation program causes the computer 12 to display the How to Use this System Screen 60 (also shown in FIG. 4). The How to Use this System Screen 60 includes a window 62, a window 64 and a return option 66. In window 62, the computer 12 retrieves and displays a list of the available system features, functions, options and operations 63 for the user to consider. The user may scroll through the list displayed in window 62 by inputting appropriate commands through either the textual or graphical inputs 16 and 18, respectively, or audio system 22 input. Selection of one of the displayed topics in window 62 with the cursor 58 and graphical input 18 (point-and-click) or audio system 22 input causes the computer 12 to retrieve and display a detailed explanation of the selected system feature, function, option or operation 63 in window 64. The descriptions provided in windows 62 and 64 further include advice 63 on when to use or access a particular system feature, function, option or operation. Such advice 63 assists the user in efficiently using the system 10 to provide for a more complete and effective skill learning experience. Furthermore, in response to the selection of the return option 66 with the cursor 58 and graphical input 18 (point-and-click) or audio system 22 input, the system operation program executed by the computer 12 will return the user to the main menu 44.

In response to the selection of the "About this Title" option 50 from the main menu 44 with the cursor 58 and graphical input 18 (point-and-click) or audio system 22 input, further execution of the operational program causes the computer 12 to display the About this Title Screen 68 (also shown in FIG. 5) including a window 77. The user is further given the choice of selecting from several options including: "About this Audio-Visual Work" 70; "Ordering Information" 72; "Program Authors" 74; and "Return" 76. In response to the selection of the "About this Audio-Visual Work" option 70 with the cursor 58 and graphical input 18 (point-and-click) or audio system 22 input, the computer 12 retrieves a summary of the work as a whole from the floppy disc 32 and displays the summary in the window 77 for user consideration. In response to the selection of the "Ordering Information" option 72 with the cursor 58 and graphical input 18 (point-and-click) or audio system 22 input, the computer 12 retrieves ordering information on the current title and other titles related to the current audio-visual work from the floppy disc 32 and displays the information in the window 77. In response to the selection of the "Program Authors" option 74 with the cursor 58 and graphical input 18 (point-and-click) or audio system 22 input, the computer 12 retrieves biographical information concerning the maker(s) of the audio-visual work from the floppy disc 32 and displays the information in the window 77. Furthermore, in response to the selection of the "Return" option 76 with the cursor 58 and graphical input 18 (point-and-click) or audio system 22 input, the operational program will return the user to the main menu 44.

In response to the selection of the "Scene Menu" option 52 from the main menu 44 with the graphical input 18 (point-and-click) or audio system 22 input, further execution of the system operation program causes the computer 12 to display the Scene menu screen 78 (also shown in FIG. 6) including a window 90 and a window 92. The user is further given the choice of selecting from five options: "Language" 80; "View Scene" 82; "Self-Check" 84; "Help" 86; and "Return" 88. In response to the selection of the "Language" option 80 with the cursor 58 and graphical input 18 (point-and-click) or audio system 22 input, the computer 12 displays in window 90 a list of available language choices for the display of written information by the computer in connection with the presentation of the work. The user may then select either a native or familiar or other language for any future computer textual output.

Furthermore, with respect to the display of the Scene menu screen 78, the computer 12 retrieves a list 91 of the scenes in the selected audio-visual work from the floppy disc 32, and displays the scene list 91 in window 92. The user may scroll through the scene list 91 displayed in the window 92 by inputting appropriate commands through either the textual or graphical inputs 16 and 18, respectively, or audio system 22 input. Selection of one of the listed scenes with the cursor 58 and graphical input 18 (point-and-click) or audio system 22 input causes the computer 12 to retrieve from the floppy disc 32 and display for the user in window 90 a synopsis 93 of the selected scene. In connection with the Scene menu screen 78, the user may further obtain, through entry of an appropriate command, character information 95 comprising a list of characters along with a picture of each character and a brief character description.

In response to the selection of the "View Scene" option 82 from the Scene menu screen 78 with the cursor 58 and graphical input 18 (point-and-click) or audio system 22 input, the video display 20 is cleared by the computer 12 and a signal is transmitted to the audio-visual playback device 14 to retrieve and playback the previously selected scene from the video disc 36. The selected scene is then displayed to the user for full screen viewing on the video display 20. During such full screen display, several interactive learning features, to be described herein with respect to the description of the "View the Audio-Visual Work" option 54, are also made available (as generally indicated at reference 83) to the user for selection.

In response to a user selection of the "Self-Check" option 84 from the Scene menu screen 78 with the cursor 58 and graphical input 18 (point-and-click) or audio system input, further execution of the system operation program causes the computer 12 to display the Self-Check screen 96 shown in FIG. 7 on the video display 20. The scene selected by the user is displayed by the computer 12 for user viewing in window 98. When display of the scene is completed, the computer retrieves a series of questions and answers 97 regarding the selected scene from the floppy disc 32 and displays the questions in window 100 for user consideration. Preferably, such questions are designed to test user oral and/or reading comprehension of the selected scene. Through use of the included "Language" option 102, the user may select the language with which the questions (and answers) are displayed. Answers to questions may either be formulated in the head of the user or input into the computer 12 via the textual input 16 or audio system 22 input. When requested by the user by selecting window 104 with the cursor 58 and graphical input 18 (point-and-click) or audio system 22 input, the computer 12 will retrieve from floppy disc 32 and display answers to each of the questions in window 104. Audibly input answers are processed in accordance with the speech recognition functionality of the processor 24 and compared to the correct answers. Following either computer 12 checking of input answers for correctness, or user review of the formulated answers for correctness, a selection of either the "Play Video" option 106 (to continue with the playback of the audio-visual work), or the "Scene List" option 108 (to return to the Scene menu screen 78) may be made.

In response to the selection of the "Help" option 86 from the Scene menu screen 78 with the cursor 58 and graphical input 18 (point-and-click) or audio system 22 input, the system operation program executed by the computer 12 returns to the How to Use This System menu screen 60 described above. Unlike the exit from the How to Use This System menu screen 60 back to the Main menu 44 described above, when the user enters the How to Use This System menu from the Scene menu screen 78, selection of the return option 66 will bring the user back to the Scene menu screen.

Furthermore, in response to the selection of the "Return" option 88 from the Scene menu 78 with the cursor 58 and graphical input 18 (point-and-click) or audio 22 input, the system operation program will return the user to the main menu 44.

In response to the selection of the "View the Audio-Visual Work" option 54 from the main menu 44 with the cursor 58 and graphical input 18 (point-and-click) or audio system 22 input, the computer 12 will transmit a control signal over bus 42 to the video-disc player 14a commanding the initiation of the playback from the beginning of the audio-visual work stored on the loaded video disc 36. The audio-visual work is displayed for the user, using a full screen, on the video display 20. Furthermore, the user may select through the input of appropriate commands via either the textual or graphical inputs 16 and 18, respectively, to access the interactive features 125 of the system 10 of the present invention in conjunction with the viewing of the audio-visual work. With some of these selections, the screen 110 of FIG. 8 replaces the full screen display.

The selected audio-visual work is displayed for user viewing in window 112 of screen 110. The user is further given the choice of selecting from six options: "Replay" 114; "Stop-Continue" 116; "Notes" 118; queuing controls 120; "Scene Menu" 122; and "Return" 124. In response to the selection of the "Replay" option 114 with the cursor 58 and graphical input 18 (point-and-click) or audio system 22 input, the computer 12 will direct the audio-visual playback device 14 to replay the currently displayed scene from the beginning. In response to selection of the "Stop-Continue" option 116 with the cursor 58 and graphical input 18 (point-and-click) or audio system 22 input, the computer will cause the replay of the audio-visual work to be halted. A subsequent selection of the "Stop-Continue" option 116 will cause playback to continue, commencing from the point at which it was previously stopped. By selecting one of the queuing controls 120 with the cursor 58 and graphical input 18 (point-and-click) or audio system 22 input, the user may move forward and backward from scene to scene in the audio-visual work. In response to the selection of the "Scene Menu" option 122 with the graphical input 18 (point-and-click) or audio system 22 input, the system 10 will return to the Scene Menu 78. Furthermore, in response to the selection of the "Return" option 124 with the cursor 58 and graphical input 18 (point-and-click) or audio system 22 input, the system 10 will return to the Main Menu 44.

While the audio-visual work is being displayed in window 112 using screen 110, the system 10 makes several interactive feature 125 options available for user access. The screen 110 further includes windows 126 and 128. By selecting window 126 with the cursor 58 and graphical input 18 (point-and-click) or audio system 22 input, the computer 12 retrieves from floppy disc 32 and synchronously displays in window 126 a transcription 132 of the audio portion of the audio-visual work for user consideration. Similarly, by selecting window 128 with the cursor 58 and graphical input 18 (point-and-click) or audio system 22 input, the computer 12 retrieves from floppy disc 32 and synchronously displays in window 128 a translation 134 of the audio portion of the audio-visual work for user consideration in the language selected by the user with the "Language" option 80 of the Scene Menu 78.

The screen 110 further includes a window 130. With the display of the audio transcription and/or translation in windows 126 and/or 128, another option is made available as the computer 12 will highlight or flag 136 certain items, words or phrases displayed in windows 126 and 128 to catch the attention of the user. Selection of this option is made by accessing the "Notes" option 118 with the cursor 58 and graphical input 18 (point-and-click) or audio system 22 input. By thereafter selecting one of the highlighted or flagged items, words or phrases with the cursor 58 and graphical input 18 (point-and-click) or audio system 22 input, the computer 12 pauses playback of the audio-visual work, retrieves information concerning the selected item, word or phrase from floppy disc 32, and displays the information for user consideration in window 130. The type of highlighting or flagging used on an item, word or phrase (for example, the choice of a particular color, font, or icon) differs with respect to the type of information that will be retrieved if the item, word or phrase is selected. For example, the displayed information may comprise a definition of the selected word or phrase retrieved from a dictionary whose contents are selectively stored on the floppy disc 32 or mass storage 28. In addition, the displayed information may comprise a grammatical note concerning the selected word or phrase and its use in the displayed sentence. Furthermore, the displayed information may comprise historical, cultural or geographic information (taken from, for example, encyclopedic references or a map) concerning the selected item, word or phrase or aspects of the selected scene currently being viewed by the user.

Other interactive feature 125 options for assisting with student learning are also made available for user selection while the audio-visual work is being displayed using screen 112. For example, the user may select a "fill-in-the-blanks" option 138 through user entry of an appropriate command with the textual input 16 or audio system 22 input. Alternatively, the fill-in-the-blanks option 138 is automatically executed by the computer 12 at certain pre-programmed points in the playback of the audio-visual work. With execution of the fill-in-the-blanks option 138, the computer 12 provides a transcription 132 of a line of dialog or a short portion of a conversation in window 126 with randomly or purposefully selected words left blank. Playback of the audio-visual work by the computer 12 is then paused to allow the user to consider the previously played portion of the work and choose words in accordance with the user's recollection of the dialog to fill in the provided blank spaces. In addition, the chosen words may be input into the computer 12 via the textual input 16 or audio system 22 input. The computer 12 will then display the correct answers for user consideration and comparison to the chosen words. In the event of user input of the words, the computer 12 will process the input (in accordance with the speech recognition functionality of the processor 24, if needed), and compare the input words with the correct words, indicating on the displayed transcription whether the user input was correct. This fill-in-the-blanks feature 138 facilitates the enhancement of user transcription and oral comprehension skills by making the user carefully listen to the audio portion of the audio-visual work. The fill-in-the-blanks option 138 is also available, if selected with the appropriate command, in connection with a display of a translation 134 of the dialog in window 128. In this instance, the feature facilitates enhancement of user translation and oral comprehension skills.

As the user advances in skill level, still other interactive feature 125 options for assisting with student learning are available for user selection while the audio-visual work is being displayed using screen 112. For example, the user may select a "role play" option 140 by inputting an appropriate command using textual input 16 or audio system 22 input. Alternatively, the role play option 140 is automatically executed by the computer 12 at certain system or teacher pre-programmed points in the playback of the audio-visual work. During execution of the "role play" option 140, the user becomes an active participant in the drama being displayed by the audio-visual work. The computer 12 will pause playback of the audio-visual work after a line of dialog or a certain scene and allow the user to supply, in context with the plot of the work from the point of view of a selected character, an appropriate response to a spoken line of dialog. Such a user formulated response may be input into the computer 12 via the textual input 16 or audio system 22 input for display (after recognition if an audible input) in window 130. To facilitate effective foreign language learning, the user responses made during role play may be formulated and/or input in either or both the foreign language to be learned and/or the native (or other) language selected by the user. By selecting the "Continue" option 116, the playback of the audio-visual work continues and next line of dialog is spoken, with the transcription and translation displayed in windows 126 and 128, respectively, for user comparison to the formulated and/or entered (shown in window 130) user role play response. This feature tests not only user oral and written comprehension and understanding of the language, but also the user's ability to effectively engage in a conversation based on a viewed context.

Furthermore, as the student becomes more proficient at the selected foreign language, transcription and translation input options 142 and 144, respectively, may be selected. In either option, the computer 12 will cause the playback of a line of dialog or short conversation from the audio-visual work. In the transcription input option 142, the student will formulate a transcription of the line of dialog or short conversation and preferably use the textual input 16 to enter the transcription for display in window 130. Alternatively, the user may input the transcription using the audio system 22 input and the speech recognition functionality of the processor 24. Similarly, in the translation input option 144, the student will formulate and preferably enter a translation of the line of dialog or short conversation. Following formulation and/or entry, the user may select window 126 or 128, as appropriate, with the cursor 58 and graphical input 18 (point-and-click) or audio system 22 input, and the computer 12 will display the correct transcription or translation (or both) for user comparison against their formulated transcription or translation, and/or computer comparison against their entered transcription or translation. Again, such a feature tests user oral and written comprehension and understanding of the foreign language.

To assist the student in practicing their foreign language pronunciation, yet another interactive feature 125 learning option is made available for user selection during display of the audio-visual work. When the pronunciation practice option 146 is selected by the user through the entry of an appropriate command with the textual input 16 or audio system 22 input, the computer 12 will cause the playback of a short portion of the audio-visual work (perhaps just one or two words or a phrase) for the user to listen to and watch. The system 10 then pauses and allows the user to audibly repeat the short portion, with the spoken repetition received by the microphone of the audio system 22 and recorded by the computer 12. The user spoken repetition and actual audio from the audio-visual work are then replayed by the computer 12 for the user to hear so that the user may make an audible comparison and further practice proper pronunciation. In addition, or in the alternative, the audible input of the user may be processed for recognition by the speech recognition functionality of the processor 24. To further assist the user in the use of the pronunciation practice option 146 (or in the transcription and translation options mentioned above, if necessary), the rate of speech for the audio portion of the audio-visual work may be slowed down by the computer 12 upon user command while introducing only a minimal, if any, distortion in the sound. This allows the user to carefully and slowly listen to individual words in fast-paced conversations, such as in arguments, or in instances where multiple characters are talking at the same time.

Referring now to FIG. 9, illustrated are flow-charts of steps of processes executed by interactive learning System 10. First an audio-visual work stored on the audio-video disc 36 is placed in an audio-visual playback device 14a. At step 202, textual information including dialog spoken on the audio-visual work is stored by the system. At step 204, the system controls the playback device 14a to display a portion of the stored audio-visual work on the display 20. Using the stored dialog, the system retrieves and displays a line of dialog corresponding to that spoken in the audio-visual work at step 206. The system then paused the playback device 14a at step 208 to receive a response of the student at step 210 as to the dialog just spoken. This response, if it is spoken, is received by the audio system 22 and speech-recognition processed at step 212. Once a response is received, the system retrieves and displays at step 214 the actual responsive dialog next spoken in the audio-visual work and compares the response.

Referring to FIG. 10, like the process of FIG. 9, dialog for an audio-visual work is stored at step 218 and the playback device 14 is controlled to selectively display a portion of the audio-visual work which is stored on audio-video disc 36 in the playback device 14a at step 220. However, as indicated by step 222, the line of dialog that is retrieved and displayed has selected words left blank. The playback of the audio-visual work is then paused at step 224 and the student's guess as to the missing words are received at step 226. Once received, the completed line of dialog is retrieved and displayed at step 228, and then compared to the student response at line 230.

Referring to FIG. 11, comprehension questions and answers concerning the audio-visual work are stored by the system at step 232. The system 10 controls the playback device 14 to selectively display a portion of the audio-visual work at step 234. At step 236, the system retrieves and displays one or more comprehension questions concerning the displayed portion of the audiovisual work and then pauses playback of the audio-visual work at step 238. The student then responds to the system at step 240 and retrieves and displays on the video display 20 the correct answers at step 242. The correct answers are then compared to the student's response at step 244.

Referring to FIG. 12, the system stores a transcription of dialog spoken on the audio-visual work at step 246, controls the playback device 14 to selectively display a portion of the audio-visual work for student viewing on the video display 20 at step 248, and pauses playback of the audio-visual work at step 250. The system then waits for a student to respond with a guess as to the dialog spoken in the displayed portion of the audio-visual work at step 252. If the response is spoken and received by the audio system 22, the system performs a speech-recognition process at step 254. After receiving a response, the system, at step 256, retrieves and displays a transcription of the dialog spoken in the displayed portion of the audio-visual work in conjunction with redisplaying the portion of the audio-visual work. The student guess is then compared to the transcription at step 258.

Referring now to FIG. 13, the system begins at step 260 by storing a translation of each spoken line of dialog in a foreign language audio-visual work and then controls the playback device 14 to display a portion of the foreign language audio-visual work for a student at step 262. At step 264, the playback device 14 is paused and a student's guess as to proper translation of the dialog spoken in the displayed portion is received at step 266. If the students speaks the response, it is speech-recognized by the audio system 22 system at step 268. After receipt, the system retrieves and displays, at step 270, the stored translation of dialog in conjunction with the redisplay of the portion of the audio-visual work and compares it, at step 272, to the student response.

Figure 14:
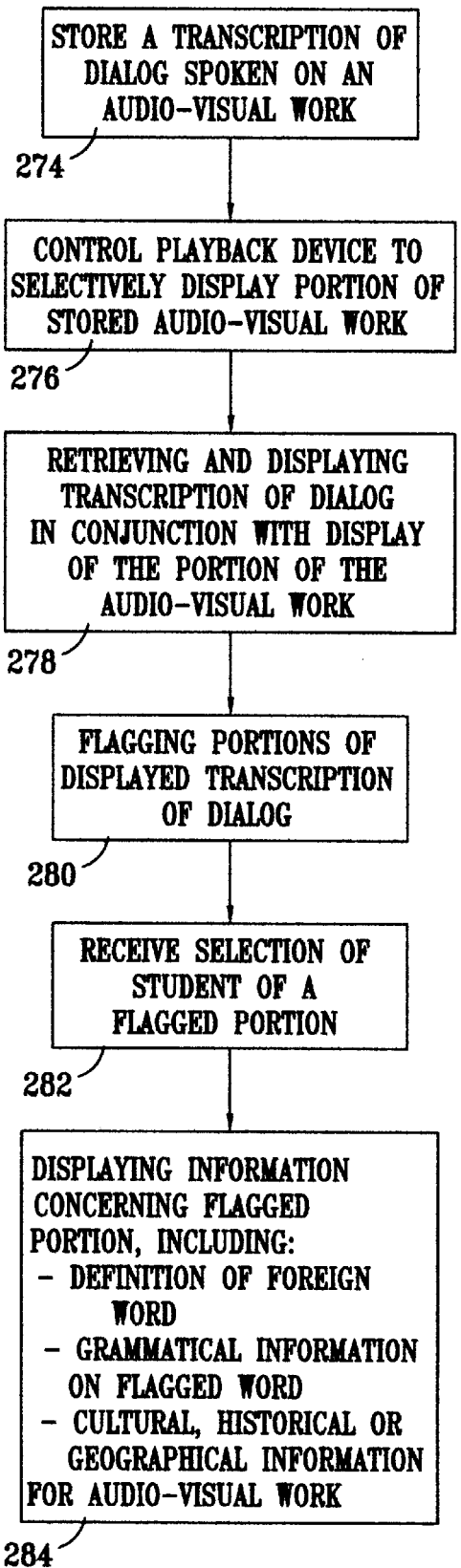
FIG. 14 is a flow diagram of a sixth interactive learning process performed by the interactive learning system.

In FIG. 14, the system 10 begins by storing a transcription of dialog spoken on an audio-visual work at step 274. The system then controls the playback device 14, at step 276, to selectively display a portion of the audio-visual work stored on the audio-video disc 36 in the playback device 14a. The system then retrieves and displays a transcription of dialog spoken on the audio-visual work, at step 278, and flags portions of the displayed transcription at step 280. Once a student selects a flagged portion, the system responds at step 284 by displaying information stored concerning the flagged portion. The response can be a definition of the word, grammatical information on the flagged portion, or cultural, historical or geographic information concerning the flagged portion.

Figure 15:
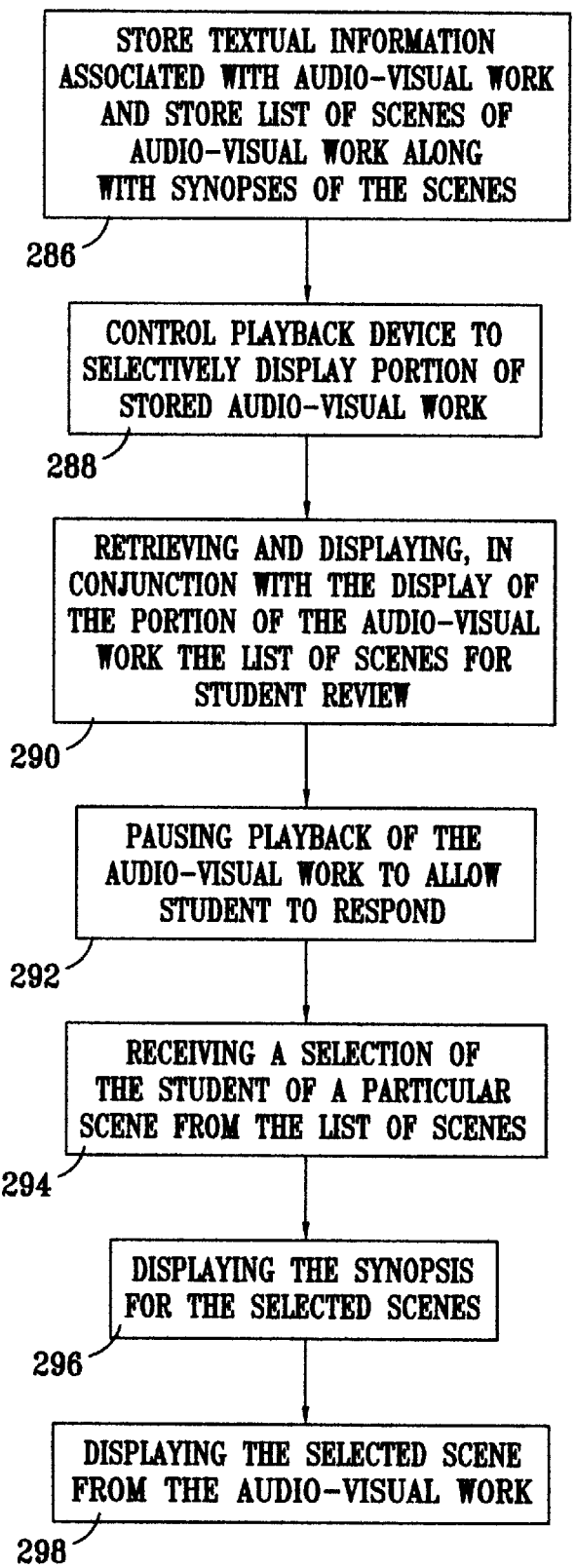
FIG. 15 is a flow diagram of a first interactive learning process performed by the interactive learning system.

Referring to FIG. 15, the system 10 stores, at step 286, textual information associated with an audio-visual work, including a list of scenes and synopses of the scenes in the audio-visual work. At step 288, the system controls the playback device 14 to selectively display a portion of the audio-visual work stored on the audio-video disc 36 in the video device 20. The system, at step 290, retrieves and displays the list of scenes in the audio-visual work for student review and pauses, at step 292, the playback of the portion of the audio-visual work in order to receive, at step 294, a selection of the student of a particular scene from the list of scenes. The system then displays at step 296 the synopses for the selected scene and, at step 298, displays the selected scene from the audio-visual work.

Another interactive feature 125 option made available to the user in connection with the display of the dialog transcription and/or translation is the selection of a displayed word or phrase for storage and subsequent review. Each selected word or phrase (along with a definition and use context) is stored in a study file 148 maintained by the user. The computer 12 then makes several word processing options available to the user for manipulating the study file to facilitate user learning of the selected words and phrases. For example, the list may be alphabetized, randomized, edited, etc. Furthermore, all or part of the study file may be output by the computer 12 in a hard copy for further user review away from the system 10.

In response to the selection of the "Quit" option 56 from the main menu 44 with the cursor 58 and graphical input 18 (point-and-click) or audio system 22 input, the computer 12 will end the current learning session, close any system program files, close all user files, and return to the computer operating system for entry of a command.

Although an embodiment of the present invention has been illustrated in the accompanying Drawings and described in the foregoing Detailed Description, it will be understood that the invention is not limited to the embodiment disclosed, but may be modified without departing from the scope of the invention as set forth and defined by the following claims.

I claim:

1. A method for teaching a student a foreign language with an interactive audio-visual presentation system including a playback device for accessing a medium storing an audio-visual work comprising scenes of a story and dialog in a foreign language associated with the scenes of the story and a display device for displaying the audio-visual work, comprising the steps of:

storing textual information of a dialog in a foreign language associated with the scenes of the story of the audio-visual work;

controlling the playback device to selectively display a portion of the stored scenes of the audio-visual work for student viewing and for audio presentation of the associated dialog in the foreign language;

retrieving and displaying, in conjunction with the display of the portion of the stored scenes of the audio-visual work, an associated portion of the stored foreign language textual information; and selectively pausing playback of the scenes of the audio-visual work and display of the associated foreign language textual information to allow the student to respond in the foreign language to the displayed portion of the associated textual information.

2. The method as in claim 1 further including the steps of:

inputting the response from the student; and comparing the input response with a correct response.

3. The method as in claim 1 further including the steps of:

audibly inputting the response by the student;

speech recognizing the audibly input response; and comparing the recognized audibly input response with a correct response.

4. The method as in claim 1 wherein the step of storing comprises the step of storing a plurality of comprehension testing questions and correct answers associated with the audio-visual work, and wherein the step of retrieving and displaying comprises the step of displaying at least one comprehension testing question associated with the displayed portion of the audio-visual work, and wherein the step of pausing comprises the step of pausing to allow the student to respond with an answer to each displayed comprehension testing question, the method further comprising the steps of:

retrieving and displaying the correct answers to each displayed comprehension testing question; and comparing the student answers with the correct answers to each displayed comprehension testing question.

5. The method as in claim 1 wherein the step of storing includes the step of storing a list of scenes in the audio-visual work along with scene synopses, and wherein the step of retrieving and displaying includes the step of displaying the list of scenes for student review, the method further including the steps of:

inputting a selection by the student of a particular scene from the list of scenes;

displaying the synopsis of the selected scene; and displaying the selected scene from the audio-visual work for student viewing.

6. The method as in claim 1 wherein the step of storing includes the step of storing a transcription of the dialog spoken on the audio-visual work, and wherein the step of retrieving and displaying includes the step of displaying the transcription of the dialog in conjunction with the display of the audio-visual work, the method further including the steps of:

flagging portions of the displayed transcription of the dialog;

inputting a selection by the student of a flagged portion in the displayed transcription of the dialog; and displaying information concerning the flagged portion.

7. The method as in claim 6 wherein the step of displaying information concerning the flagged portion comprises the step of displaying a definition for a selected word in the transcription.

8. The method as in claim 6 wherein the step of displaying information concerning the flagged portion comprises the step of displaying grammatical information for a selected word in the transcription.

9. The method as in claim 6 wherein the step of displaying information concerning the flagged portion comprises the step of displaying cultural information for the audio-visual work.

10. The method as in claim 6 wherein the step of displaying information concerning the flagged portion comprises the step of displaying historical information for the audio-visual work.

11. The method as in claim 6 wherein the step of displaying information concerning the flagged portion comprises the step of displaying geographic information for the audio-visual work.

12. A method for teaching a student a foreign language with an interactive audio-visual presentation system including a playback device for accessing a medium storing an audio-visual work comprising scenes of a story and dialog in a foreign language associated with the scenes of the story and a display device for displaying the audio-visual work, said teaching method comprising the steps of:

storing dialog in a foreign language associated with the scenes of the story of the audio-visual work;

controlling the playback device to selectively display a portion of the stored scenes of the audio-visual work for student viewing;

retrieving and displaying, in conjunction with the display of the portion of the stored scenes of the audio-visual work, a line of dialog from the audio-visual work;

selectively pausing playback of the portion of the stored scenes of the audio-visual work to allow the student to respond with an answer as to a responsive line of dialog next spoken in the audio-visual work;

continuing playback of the scenes of the audio-visual work;

retrieving and displaying an actual responsive line of dialog next spoken in the portion of the stored scenes of the audio-visual work; and comparing the answer of the responsive line of dialog by the student with the displayed actual responsive line of dialog next spoken in the portion of the stored scenes of the audio-visual work.

13. A method for teaching a student a foreign language with an interactive audio-visual presentation system including a playback device for accessing a medium storing an audio-visual work comprising scenes of a story and dialog in a foreign language associated with the scenes of the story and a display device for displaying the audio-visual work, comprising the steps of:

storing dialog in a foreign language associated with the scenes of the story of the audio-visual work;

controlling the playback device to selectively display a portion of the stored scenes of the audio-visual work for student viewing;

retrieving and displaying, in conjunction with the display of the portion of the stored scenes of the audio-visual work, a line of dialog from the audio-visual work with selected words therein left blank;

selectively pausing playback of the portion of the stored scenes of the audio-visual work to allow the student to respond with an answer as to the selected words left blank in the displayed line of dialog;

retrieving and displaying a completed line of dialog; and comparing each student answer of the selected words with the displayed completed line of dialog.

14. A method for teaching a student a foreign language with an interactive audio-visual presentation system including a playback device for accessing a medium storing an audio-visual work comprising scenes of a story and dialog in a foreign language associated with the scenes of the story and a display device for displaying the audio-visual work, comprising the steps of:

storing the foreign language dialog associated with the scenes of the story spoken on the audio-visual work;

controlling the playback device to selectively display scenes of the stored audio-visual work for student viewing and to selectively present audibly the associated dialog in the foreign language;

pausing playback of the audio-visual work;

inputting an answer by the student as to the dialog spoken with the displayed portion of the audio-visual work;

retrieving and displaying the stored dialog spoken with the displayed portion of the audio-visual work; and comparing the student answer as to the spoken dialog with the stored dialog actually spoken with the displayed portion of the audio-visual work.

15. The method as in claim 14 wherein the step of storing comprises the step of storing a transcription of each spoken line of dialog, and wherein the step of inputting comprises the step of inputting an answer by the student as to the transcription of the dialog spoken with the displayed portion.

16. The method as in claim 15 wherein the step of retrieving and displaying includes the step of displaying the transcription of each spoken line of dialog in conjunction with a re-display of the displayed portion of the stored audio-visual work.

17. The method as in claim 14 wherein the step of storing comprises the step of storing a translation of each spoken line of dialog, and wherein the step of inputting comprises the step of inputting an answer by the student as to the translation of the dialog spoken in the displayed portion.

18. The method as in claim 17 wherein the step of retrieving and displaying includes the step of displaying the translation in conjunction with a re-display of the previously displayed portion of the stored foreign language audio-visual work.

19. The method as in claim 14 wherein the step of inputting comprises the step of audibly inputting the answer by the student, further including the step of speech recognizing the audibly input answer for comparison to the dialog actually spoken.

20. A system for interactive student teaching of a foreign language, comprising:

a playback device for playing a recorded foreign language feature length motion picture;

a display device; and a computer connected to the playback device and display device including:

means for storing textual information in a foreign language associated with the motion picture;

means for controlling the playback device to selectively display on the display device for student viewing a portion of the stored motion picture;

means for retrieving an associated portion of the stored textual information for display on the display device in conjunction with the portion of the stored motion picture; and means for pausing playback of the motion picture and display of the associated textual information to allow the student to respond to the displayed portion of the associated textual information.

21. The system as in claim 20 wherein the computer further includes:

means for allowing the student to input the response to the displayed portion of the associated textual information; and means for comparing the input response to a correct response.

22. The system as in claim 20 wherein the computer further includes:

means for audibly inputting by the student the response;

means for speech recognizing the audibly input response; and means for comparing the recognized audibly input response to a correct response.

23. A system for interactive student teaching of a foreign language, comprising:

a playback device for playing an audio-visual work comprising scenes of a story and dialog in a foreign language associated with the scenes of the story;

a display device; and a computer connected to the playback device and display device including:

means for storing dialog in a foreign language associated with the scenes of the story of the audio-visual work;

means for controlling the playback device to selectively display on the display device for student viewing a line of dialog from the stored scenes of the audio-visual work;

means for retrieving a line of dialog from the stored scenes of the audio visual work for display on the display device in conjunction with the portion of the stored scenes of the audio-visual work;

means for pausing playback of the audio-visual work and display of the line of dialog to allow the student to respond to the displayed line of dialog with an answer as to the next line of dialog spoken in the portion of the stored scenes of the audio-visual work;

means for continuing playback of the stored scenes of the audio-visual work;

means for displaying an actual responsive line of dialog next spoken in the stored scenes of the audio-visual work; and means for comparing the actual responsive line of dialog with the student answer as to the next line of dialog.

24. A system for interactive student teaching of a foreign language, comprising:

a playback device for playing an audio-visual work comprising scenes of a story and dialog in a foreign language associated with the scenes of the story;

a display device; and a computer connected to the playback device and display device including:

means for storing dialog in a foreign language associated with the scenes of the story of the audio-visual work;

means for controlling the playback device to selectively display on the display device for student viewing a line of dialog from the stored scenes of the audio-visual work with selected words therein left blank;

means for retrieving a line of dialog from the stored scenes of the audio visual work with selected words therein left blank for display on the display device in conjunction with the portion of the stored audio-visual work;

means for pausing playback of the audio-visual work and display of the line of dialog from the portion of the stored scenes of the audio visual work with selected words left blank to allow the student to respond to the displayed blank with an answer by the student as to the words left blank in the displayed line of dialog;

means for retrieving and displaying a completed line of dialog; and means for comparing the completed line of dialog with the student answer as to the selected blank words in the line of dialog.

25. The system as in claim 20 wherein the textual information comprises a plurality of comprehension testing questions concerning the audio-visual work along with correct answers thereto, and wherein the means for retrieving and displaying includes means for displaying at least one comprehension testing question concerning the displayed portion of the audio-visual work, and wherein the student response comprises an answer to each displayed comprehension testing question, the computer further including:

means for retrieving for display the correct answer to each displayed comprehension testing question; and means for comparing the correct answers to each formulated student answer.

26. A system for interactive student teaching of a foreign language, said teaching system comprising:

a playback device for playing an audio-visual work comprising a recorded feature length motion picture;

a display device; and a computer connected to the playback device and the display device including:

means for storing dialog spoken on the audio-visual work;

means for controlling the playback device to selectively display for student viewing a portion of the stored audio-visual work;

means for pausing playback of the audio-visual work by the playback device to allow the student to input an answer as to the dialog spoken on the displayed portion of the audio-visual work; and means for retrieving the stored dialog spoken on the displayed portion of the audio-visual work for display and comparison to the input student answer guess as to the dialog.

27. The system as in claim 26 wherein the means for storing comprises means for storing a transcription of the spoken line of dialog, the input student guess comprising a guess as to the transcription of the dialog spoken in the displayed portion.

28. The system as in claim 26 wherein the means for storing comprises means for storing a translation of the spoken line of dialog, the input student answer comprising an answer as to the translation of the dialog spoken in the displayed portion.

* * * * *